United States Patent [19]
Maroy et al.

[11] Patent Number: 5,348,644
[45] Date of Patent: Sep. 20, 1994

[54] PROCESS AND APPARATUS FOR CONTACTING A HYDROCARBON FEEDSTOCK WITH HOT SOLID PARTICLES IN A TUBULAR REACTOR WITH A RISING FLUIDIZED BED

[75] Inventors: Pierre Maroy, Versailles; Roben Loutaty, Le Havre; Thierry Patureaux, Montivilliers, all of France

[73] Assignee: Compagnie de Raffinage et de Distribution Total France, Levallois-Perret, France

[21] Appl. No.: 612,322

[22] Filed: Nov. 13, 1990

[30] Foreign Application Priority Data

Nov. 10, 1989 [FR] France ............... 89 14787

[51] Int. Cl.$^5$ ............................. C10G 11/18
[52] U.S. Cl. ............................. 208/153; 208/127; 208/158; 208/176
[58] Field of Search ............ 208/158, 176, 127

[56] References Cited

U.S. PATENT DOCUMENTS

| | | | |
|---|---|---|---|
| 2,317,379 | 4/1943 | Hemminger | 208/176 |
| 2,358,497 | 9/1944 | Eyloff | 208/158 |
| 2,374,518 | 4/1945 | Wolk et al. | 208/158 |
| 2,487,370 | 11/1949 | Putney | 208/158 |
| 2,517,339 | 8/1950 | Offutt et al. | 208/176 |
| 2,719,112 | 9/1955 | Kearby et al. | 208/158 |
| 2,759,880 | 8/1956 | Brown | 208/158 |
| 4,675,099 | 6/1987 | Skraba | 206/157 |
| 4,832,825 | 5/1989 | Mauleon et al. | 206/157 |

FOREIGN PATENT DOCUMENTS 0191695  2/1988  European Pat. Off. ...... C10G 11/18

OTHER PUBLICATIONS

Search Report issued by the French Patent Office with respect to French Priority Application No. 89 14787 Jun. 29, 1990.

*Primary Examiner*—Helane Myers
*Attorney, Agent, or Firm*—A. Thomas S. Safford

[57] ABSTRACT

In a fluidized catalytic cracking (FLC) type unit for contacting of a hydrocarbon feedstock with hot solid particles in a fluidized bed in an upright tubular-type upflow hydrocarbon conversion reactor, there is provided, between the means for fluidization and the means for injection of the feedstock, a means for causing the fluidized phase at the periphery of the reactor to rotate about the axis of the reactor.

15 Claims, 3 Drawing Sheets

PROCESS AND APPARATUS FOR CONTACTING A HYDROCARBON FEEDSTOCK WITH HOT SOLID PARTICLES IN A TUBULAR REACTOR WITH A RISING FLUIDIZED BED

CROSS REFERENCE TO RELATED APPLICATION

This application claims the priority of French Patent Application Serial Number 89 14,787, filed 10 Nov. 1989. The disclosure of that application is incorporated here by reference.

FIELD OF THE INVENTION

The present invention relates to the fluid state cracking of hydrocarbon feedstocks. More particularly, it concerns a new process and apparatus for contacting a hydrocarbon feedstock with hot solid particles in a tubular reactor operated with a rising fluidized bed.

BACKGROUND OF THE INVENTION

It is known that the petroleum industry routinely uses conversion processes, and particularly cracking processes, in which hydrocarbon molecules with a high molecular weight and a high boiling point are broken down into smaller molecules with a lower boiling point suitable for the desired purpose.

Many of these processes employ fluid-bed conversion techniques in which solid particles (whether catalytic or not) are contacted for a very short time with hydrocarbons. The solid particles provide, in particular, the heat required for the conversion reaction.

The process most widely used at present is the so-called Fluid Catalytic Cracking, or FCC, process. However other fluid-bed conversion processes, and particularly thermal cracking or visbreaking processes, have been developed.

For the sake of simplicity, the invention will be described in this specification by way of example with reference to the catalytic cracking process. However, it should be understood that the invention is also applicable to most other fluid-bed hydrocarbon conversion processes in which the feedstock to be cracked is contacted in the vapor phase with solid particles, whether catalytic or not.

The most recent developments have confirmed that the most important parameters of the cracking reaction are the rapidity and homogeneity with which the feedstock is contacted with the catalyst particles, as well as the quality of the atomization and of the vaporization of the feedstock in the reaction zone of the tubular reactor.

The many studies conducted by the applicants and their assignee with a view to improving the heat transfer between the solid particles in the fluid bed and the feedstock to treated have (1) shown that the yields actually obtained in the highest efficiency cracking units used up to now have been lower than the yields to be expected on the basis of theoretical studies and (2) that this difference has been due mainly to poor distribution of the catalyst particles in the injection zone.

A first approach to a solution to this problem has already been proposed by the assignee's European Patent No. 191,695) and has sought to correct mainly the axial irregularities in the stream of hot catalyst coming from the regeneration zone. However, measurements made in particular on models have not only shown that the distribution of the catalyst particles was not uniform in a plane normal to the direction of the forward movement of the particles (also known as the radial distribution)—the concentration of these particles being greater at the periphery of the tubular reactor than in its center—but a downward backflow of solids was observed at the level of the walls of the reactor. The result is a decrease in the probability and quality of a collision between the atomized feedstock (generally injected in the more axial direction of the reactor) and the catalyst particles, since the latter are dispersed largely at the periphery.

SUMMARY OF THE INVENTION

The present invention thus seeks to propose a process and an apparatus for contacting a hydrocarbon feedstock with hot solid particles in a tubular reactor operated with a fluidized bed which, by reason of improved fluidization of the solid particles upstream of the zone of injection of the feedstock, assures better uniformity of the distribution of the hot particles and of the droplets of atomized feedstock, thus resulting in better heat transfer, minimized backmixing, better catalytic activity, and, hence, improved conversion of the feedstock to be cracked.

BRIEF DESCRIPTION OF THE DRAWINGS

For purposes of greater clarity and to provide a context for the invention, the structure of a conventional fluid-bed cracking unit will be outlined below with reference to FIG. 1 of the accompanying drawings. In the drawings.

DESCRIPTION OF SPECIFIC EMBODIMENTS

Figure 1:
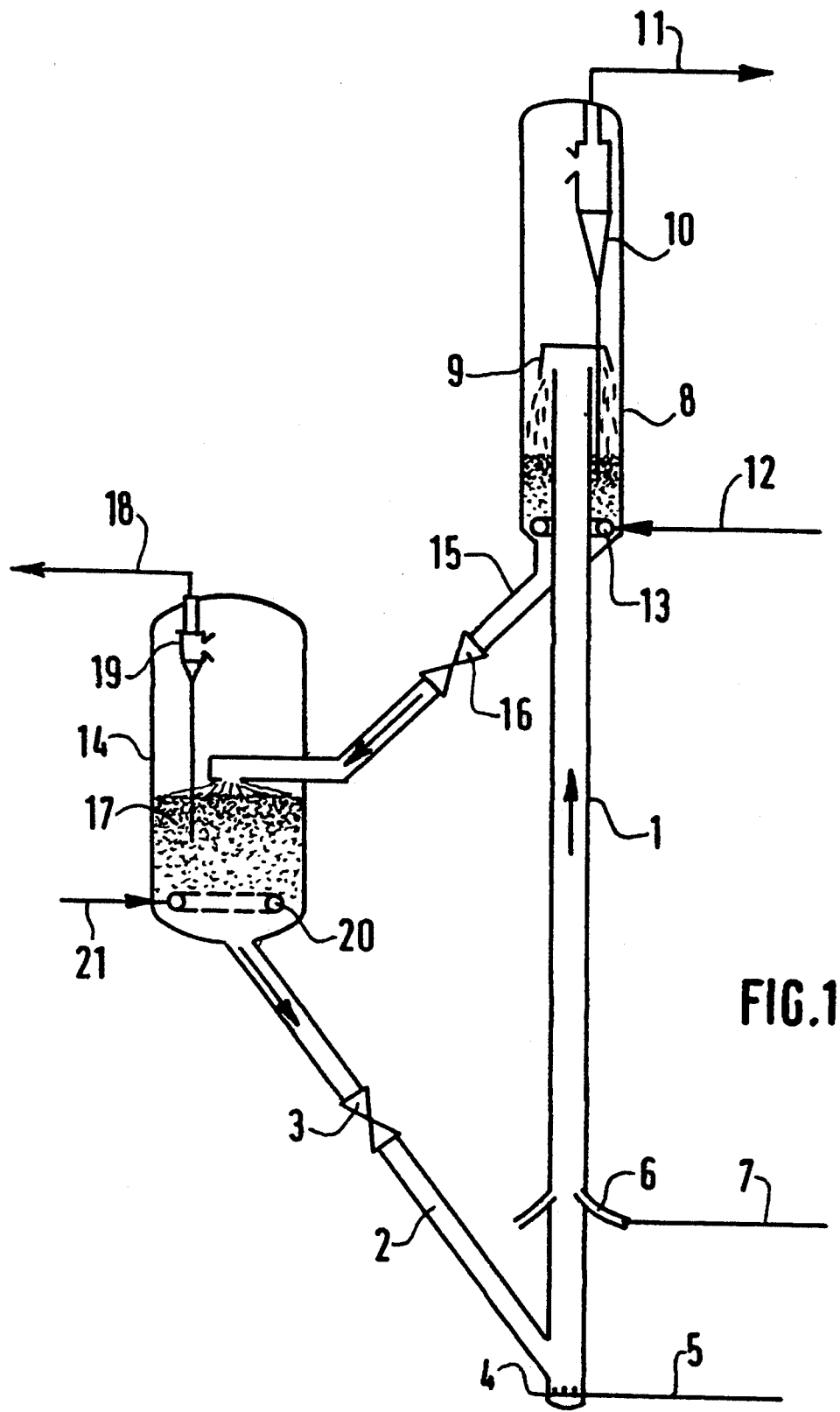
FIG. 1 is a diagrammatic view of a catalytic cracking unit with a tubular reactor with a rising fluidized bed.

In the various figures, similar components are designated by the same reference numerals.

In conventional apparatus for the injection of catalyst into an upflow tubular reactor, or riser, such as that shown in FIG. 1, the regenerated catalyst is introduced into the base of the reactor 1 through a line 2 at a rate determined by opening or closing a valve 3. The catalyst particles are then driven upward in the riser by injection at its base of a gaseous fluid coming from line 5, this injection being made by means of a fluid distributor or diffuser 4. The feedstock to be cracked is introduced into the stream of catalyst particles at a higher level through the line 7 by means of an appropriate atomizer 6.

The column 1 discharges at its top into a chamber 8, which here is concentric with it and in which the gaseous effluents are separated from the catalyst particles by means of a ballistic separator 9 and the deactivated catalyst particles are stripped. The reaction products are separated from any catalyst in a cyclone system 10 which is accommodated in the upper part of the chamber 8 and at the top of which a line 11 is provided for the discharge of the effluents from the reaction to the exterior. The deactivated catalyst particles drop to the bottom of the chamber 8, where the diffuser 13 supplies the fluidized bed with a stripping gas, usually steam, from a line 12. The deactivated catalyst particles so stripped are discharged to a regenerator 14 through a pipe 15 in which a control valve 16 is provided.

The regenerator 14 here has only one regeneration chamber, where the deactivated catalyst particles are introduced into the upper part of the fluidized bed 17, while the gases of combustion are discharged through the line 18 after passing through a cyclone 19.

The catalyst particles are regenerated in a fluidized bed by combustion of the coke and of the hydrocarbons still present on their surface or in their pores through the injection of air or of oxygen by means of the diffuser 20, supplied from the line 21. The catalyst particles, which have thus been brought to a high temperature by the heat of combustion, are returned to the base of the riser 1 through the line 2.

From the research conducted by the applicants and their assignee on the conditions of injection, it has become apparent that the spreads observed between the theoretical and actual yields are attributable to poor distribution of the particles in the reaction section, and theoretical studies have shown that this poor distribution is linked to velocity differences in the reaction section. In fact, when the fluids in the axis of the reactor move at high velocity, those at its periphery are slowed down by the walls. As a result, the catalyst particles at the periphery of the reactor are not fluidized, or then only poorly, a phenomenon that is known to those skilled in the art as backmixing. In fact, these particles then distribute themselves so that the density of the mixture of particles and fluids is inversely proportional to the velocity of the fluids. As a result, the particles are preferentially disposed at the periphery of the reactor, where they may stagnate or even drop down along the wall. When the atomized feedstock then comes into contact with the inordinately dense stream of catalyst at the periphery, an excessively high input of heat consequently occurs, and this gives rise to an overcracking of the feedstock and hence to the production of gas. Conversely, when the atomized feedstock contacts a stream of particles that is insufficiently dense in the center of the riser, relatively little or no heat transfer occurs, the desired reactions do not take place, and a considerable amount of coke deposits on the catalyst, which is thereby inactivated.

The present invention proposes to overcome these drawbacks by equalizing the velocity of the fluids and suppressing any backmixing in the zone upstream of the zone of injection of the feedstock to be cracked.

The present invention consequently has as a preferred embodiment of the invention a process for contacting a hydrocarbon feedstock with hot solid particles in an upright tubular reactor operated with a rising dilute fluidized bed, said process being characterized in that in the portion of the reaction section located below the zone of injection into the reactor of the hydrocarbon feedstock a rotational motion about the axis of the reactor is imparted to the fluidized bed so that at the level of the introduction of the feedstock the speed of rotation of the fluidized bed at the periphery of the reactor, in a plane normal to its axis, is from approximately 0.5 to approximately 1.5 times, and preferably from 0.7 to 1.3 times, the velocity of the fluids circulating along the axis of the reactor.

Setting the fluidized bed into rotation about the axis of the reactor produces an equalization of the moduli of the velocities of the fluids in the portion of the reaction section located directly below the zone of injection of the feedstock to be cracked, this velocity being directed axially in the center of the reactor and laterally at its periphery. Equalization of the moduli of the velocities of the fluids results in an equalization of the distribution of the particles and in an absence of backflow of these particles into the vicinity of the walls in the zone which follows the one where the fluidized bed is set into rotation, and in particular in the zone where the feedstock to be cracked is injected.

The feedstock can then be introduced through the line 7 and homogeneously vaporized by means of an injector 6 of a type, such as appears in European patents 157,691 and 312,428 (the disclosure of which is incorporated herein by reference) which permits the hydrocarbon feedstock to be atomized into fine droplets of a diameter of less than approximately 200 microns, and preferably less than 100 microns. Since these fine droplets are homogeneously dispersed in a fluidized bed of uniformly distributed catalyst particles, the heat transfer is uniform and the C/O ratio, that is, the ratio between the quantity of catalyst (C) and the quantity of feedstock (O) to be treated, is maintained at an appropriate value throughout the reaction zone.

The present invention may be used to particular advantage when the feedstock to be cracked is injected into a dilute, or "fast", fluidized bed, where all of the particles and the fluids have an upward motion overall. For this purpose, the average upward velocity of the particles in the fluidized bed where the feedstock is injected should generally be greater than approximately 1 meter per second, and preferably between 2 and 10 m/s. Consequently, the speed of rotation of the fluidized bed at the level of injection of the feedstock to be cracked should generally be between approximately 1 and approximately 15 m/s at the periphery of the reactor.

Particularly with catalytic-cracking catalysts of the type used up to now, the fluidized beds into which the feedstock will be injected should preferably have a density of less than approximately 500 kg/m$^3$.

The gaseous fluid used to produce the fluidized catalyst bed into which the feedstock to be cracked is injected are commonly known and may comprise steam, hydrogen, vaporized hydrocarbons having at least six carbon atoms, or mixtures thereof, or any other gas of a type that is capable of being atomized and of thus creating the conditions required for fluidization of the particles.

A first advantage of the process of the present invention is due to the equalization of the particles in the zone where the hydrocarbons are atomized. The likelihood of a collision between the feedstock droplets and the catalyst particles is reduced as a result of better heat transfer. Less coke is therefore deposited on the surface of these particles, whose activity is thus preserved for the subsequent reaction. The conversion rate of the unit and the selectivity are therefore improved, and the production of unwanted light gases is greatly reduced.

A second advantage of the process is that it promotes the admixing between a homogeneous stream of catalyst particles and a finely atomized feedstock, resulting in homogeneous and practically instantaneous vaporization and heat transfer, with the cracking reaction setting in immediately at the required temperature. All molecules of the feedstock thus will tend to undergo a reaction of the same severity. It is then possible to operate at more uniform temperatures. It even becomes possible to operate without detriment at higher temperatures and to treat heavier feedstocks (containing, in particular, more asphaltenes) in the cracking unit or to obtain a better conversion rate as well as a better octane number of the gasoline produced.

A third advantage results from the suppression of the phenomenon known as backmixing along the wall of the reactor, since coke-laden, deactivated and cooled particles then are no longer able to drop down along the wall to mix, to the detriment of the yield of the reaction, with the hot, still undeactivated particles coming from the regenerator.

A fourth advantage of the process resides in a considerable reduction of the problems of attrition in the vicinity of the walls, and particularly at the level of the feedstock injector nozzles, which also results in an appreciable lengthening of the service life of the refractory walls and of the injectors, and hence in lower maintenance costs.

A further advantage of the process of the invention stems from the decrease in the quantity of coke formed as the feedstock is contacted with the catalyst. This facilitates the regeneration of the catalyst particles by shortening their residence time in the regenerator or regenerators and reduces the likelihood of the occurrence of hot spots, which are detrimental both to the catalyst and to the regeneration chamber, and also of overall excessive heat production.

The solid particles suitable for use in accordance with the process of the present invention include all heat-transfer particles, whether catalytic or not, on which coke deposits during a hydrocarbon conversion reaction. For use in fluid-bed thermal cracking units, they include, in particular, inert heat-transfer particles of a known type, such as microspheres of kaolin or of silicates in the case of a fluid-bed steam cracking operation, or solid carbonaceous particles in fluid caking. They further include all classes of particles having diverse catalytic capabilities, especially for catalytic cracking. One particularly advantageous class is formed by catalysts having porous structures in which molecules may be contacted with active sites located in the pores. This class comprises mainly the silicates or aluminosilicates. More particularly, catalysts comprising zeolite are available commercially with supports incorporating a variety of metal oxides and combinations of such oxides, especially silica, alumina, magnesia and mixtures of these substances, as well as mixtures of these oxides with clays. The catalytic composition may, of course, incorporate one or more agents favoring one stage or another of the process. The catalyst may thus contain, in particular, agents favoring the combustion of the coke during regeneration, or agents capable of preventing cyclization of the olefins to aromatics.

The hydrocarbon feedstocks which are capable of being treated in accordance with the process of the present invention include all liquid hydrocarbons which can be vaporized at the reaction temperature of the fluidized bed for the purpose of converting them, whether catalytically or not. In particular, they include crude petroleums, whether topped or not, as well as the cuts or residues of atmospheric distillation or vacuum distillation, pitches, bitumen emulsions, aromatic extracts, catalytic slurries, synthetic oils, and used oils. These feedstocks may have undergone a prior treatment, if indicated, such as a hydrotreatment. In particular, they may comprise fractions with a boiling point as high as 700° C. and higher; they may contain a high percentage of asphaltenic products and have a high Conradson carbon content (10% and higher). These feedstocks may or may not be diluted with conventional lighter fractions.

In view of the particular mode of circulation of the fluids in the reaction zone, the implementation of the process requires a certain number of specific means, which are an integral part of certain embodiments of the present invention.

The invention therefore is further embodied by apparatus for contacting a hydrocarbon feedstock with hot solid particles in a fluidized bed in an upright tubular-type upflow hydrocarbon conversion reactor, said apparatus comprising means for introduction of the hot particles, means for fluidization of the particles in a dilute phase, and, above the means for introduction of the catalyst particles, means for injection of the hydrocarbon feedstock by spraying it into the dilute fluidized phase of hot particles, said apparatus being characterized in that there are provided, between the means for fluidization and the means for injection of the feedstock, means for setting the fluidized phase disposed at the periphery of the reactor into rotation substantially about the axis of the reactor.

The means for setting the fluidized phase into rotation preferably have no moving parts and permit the fluidized bed at the periphery of the reactor to be rotated at a speed which at the level of injection of the feedstock to be cracked is preferably from approximately 0.5 to approximately 1.5 times the upward velocity of the fluids circulating along the axis of the reactor.

The means for fluidization which permit the solid particles to be put into a dilute fluidized phase may comprise one or more fluid diffusers supplied with steam, with light gases, or with readily atomizable liquids of a known type, including in particular hydrocarbons having preferably less than six carbon atoms.

The means for injection of the hydrocarbon feedstock to be converted are preferably of the atomizer type which permits the feedstock to be distributed uniformly in the reaction zone as droplets with a diameter of less than approximately 200 microns, and preferably less than 100 microns.

A first means for setting the fluidized bed at the periphery of the reactor into rotation advantageously consists of one or more rigid strips, attached to the wall of the reactor and arranged as a spiral on the inside of that wall.

Figure 2:
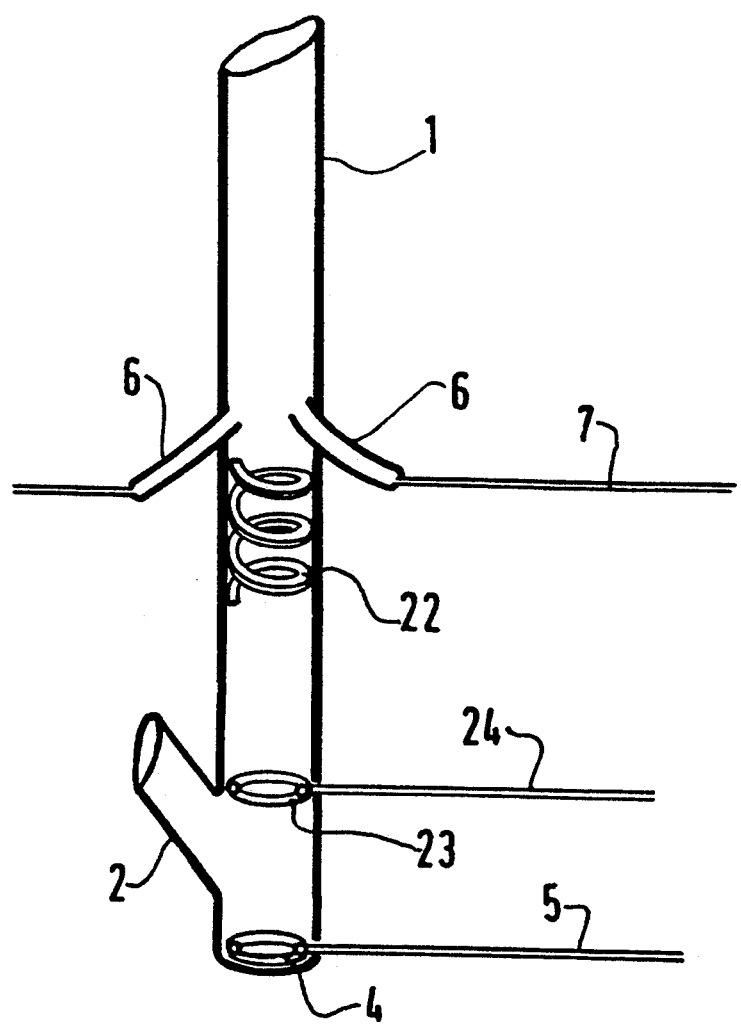
FIGS. 2 and 3 are each a diagrammatic view of apparatus in accordance with respectively different embodiments of the present invention.

In FIG. 2, which shows an injection apparatus in accordance with the present invention, the rotatory means has the form of a rigid, flat helical spring 22 that is attached to the interior wall of the reactor. The coils so formed make a constant angle with the axis of the reactor that generally is between approximately 10 and approximately 80 degrees and preferably is between 30 and 60 degrees. The rigid, flat strip may be made of any material of a known type that is capable of resisting abrasion by the particles, such as a treated metal or a ceramic, or a ceramic-coated metal. Its width may be from approximately 0.01 to approximately 1 times, and preferably from 0.05 to 0.25 times, the radius of the tubular reactor. A single strip may suffice for a small-diameter reactor, but larger reactors will require several strips, each staggered by the same pitch relative to the others.

For the purpose of preventing axial irregularities in the stream of catalyst particles entering the reaction zone, the apparatus shown in FIG. 2 comprises, as in European Patent No. 191,695 (see also U.S. Pat. No. 4,832,825) the disclosure of which is incorporated herein by reference, a two-level fluidization system for the regenerated catalyst particles. A first diffuser 4, supplied through the line 5, injects at the base of the reactor 1, below the junction of line 2 and the reactor, a sufficient quantity of fluid to maintain dense fluidization, thereby assuring homogenization of the particles in this zone. A second diffuser 23, supplied through the line 24 and located downstream of the junction between line 2 and the reactor, then permits injection of the quantity of fluid necessary to create the conditions of dilute fluidization, with a constant flow rate of the particles, which then move upwardly in the reactor at an axial velocity greater than approximately 1.5 m/s, and preferably between 2 and 10 m/s.

In the zone located directly upstream of the zone of injection of the feedstock to be converted, there is disposed in spiral form a strip 22 which permits rotational motion to be imparted to the fluids disposed at the periphery of the riser. The feedstock to be converted can then be sprayed, downstream of the strip 22, into a particularly homogeneous stream of particles by means of one or more injectors 6 distributed around the riser.

Figure 3:
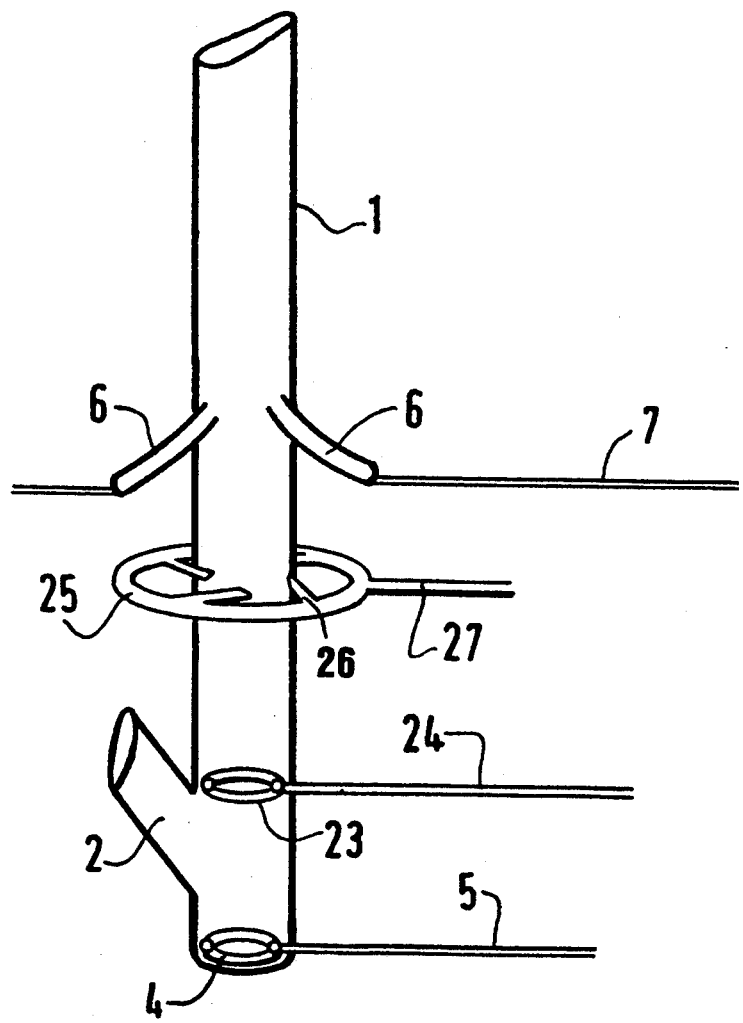
Figure 4:
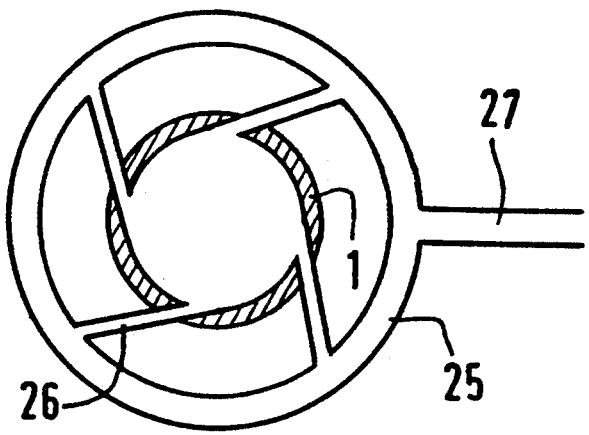
FIG. 4 is a top view in section of the embodiment in FIG. 3.

A second means for setting the diluted phase at the periphery of the reactor into rotation is shown diagrammatically in FIG. 3 and in section in FIG. 4.

In this embodiment of the invention, a diffuser 4, supplied through the line 5, is located below the junction between the line 2 carrying the regenerated catalyst particles; and the reactor 1 and a diffuser 23, supplied through the line 24, is located above the junction. However, the helical spring 22 of the embodiment shown in FIG. 2 here is replaced by a system for fluid injection tangentially to the wall of the reactor at four points located symmetrically in a plane normal to the axis of the reactor.

Each of the injector pipes 26 is supplied by a distributor 25 with fluid from the line 27. The tangential injections effected simultaneously at several points of the riser thus permit the fluidized phase disposed at the periphery of the riser to be set into rotation at a rotational speed that is directly proportional to the quantity of fluid injected.

The number of these tangential injections depends, of course, on the diameter of the reactor. While two injections effected in a diametrically opposed manner may seem sufficient for a small-diameter reactor, a substantially larger number of injections may be adopted in very much wider reactors. It is also possible, without departing from the scope of the present invention, to provide at the periphery of the reactor, at several successive levels thereof, longitudinally staggered injection points. Finally, the injection orifices may take various forms. They may be circular, rectangular, or in the form of slots, and preferably located in the same plane normal to the axis of symmetry. The fluids injected should preferably be of the same type as those used for fluidization of the particles. They should be injected in such a way that the axis of the fluid jets does not intersect the axis of symmetry of the reactor and is preferably located tangentially to the wall of the reactor.

The angle between the injectors 26 and the plane normal to the axis of symmetry of the reactor is preferably small so that the quantity of fluid that has to be injected to obtain the desired rotation can be kept to a minimum. Moreover, these injectors should observe as much as possible the axial symmetry of the reactor so as to obtain good homogeneity of the fluidized bed.

Moreover, as a variation, the feedstock injectors 6 may themselves be disposed so as to perpetuate the helical motion of the particles of the fluidized bed with a view to preventing so far as possible stagnation and any reappearance of backmixing in the downstream portion of the reaction section.

As a variation, the second diffuser 23 may be replaced by a system analogous to the aforesaid diffuser 25 and pipes 26, which will make it possible to set the fluidized bed into rotation as well as dilute it.

The diffuser 23 might also comprise means such as fins or pipes inclined to the plane of this diffuser for the purpose of directing the jets of fluid injected so as to assure that the fluidized bed is set into rotation.

The example which follows will serve to illustrate the present invention and therefore has no limiting character whatever.

EXAMPLE

Two catalytic cracking tests were conducted with the same hydrocarbon feedstock in a catalytic cracking unit equipped with injection apparatus of the type described with reference to FIGS. 1 and 3. In contrast to test 1, in which a conventional injection apparatus was used for injection of the catalyst particles and the feedstock to be cracked, test 2 was run with the aid of an apparatus in accordance with the invention, as shown in FIG. 3, permitting the feedstock to be cracked to be injected into a dilute and homogeneous fluidized bed resulting from the fluidized bed at the periphery of the reactor being set into rotation.

The feedstock treated was an atmospheric residue (hydrotreated heavy Arabian) with the following characteristics:

| | |
|---|---|
| Gravity (°API) | 19.5 |
| Sulfur (wt. %) | 0.5 |
| Total nitrogen (wt. %) | 1200. |
| Vanadium (ppm) | 15. |
| Nickel (ppm) | 8. |
| Conradson carbon (wt. %) | 6.5 |

The operating conditions during these two tests were as follows:

| | TEST 1 (Conventional injection) | TEST 2 (Inventive injection) |
|---|---|---|
| Temperature of injection of catalyst (°C.) | 797 | 785 |
| Temperature of injection of feedstock (°C.) | 180 | 180 |
| Temperature at end of riser (°C.) | 525 | 530 |
| Type of catalyst | Ultrastable zeolite | Ultrastable zeolite |
| Axial velocity (m/s) of particles at level of feedstock injector | 2.5 | 3.1 |
| Lateral speed of rotation (m/s) of fluidized bed | — | 1.5 |
| Percent of fluid injected, based on fluidized bed | 0 | 25 |
| Rate of injection (m/s) of fluid for producing rotational motion | — | 2.5 |

The results presented in the table which follows show that the apparatus of the invention makes possible, by reason of an improved distribution of the catalyst particles in the injection zone, an appreciable reduction of the deposition of coke on the catalyst and of the production of light gases, notwithstanding a higher temperature of the tubular reactor, as well as a better conversion rate and consequently improved selectivity toward gasoline and light distillate.

TABLE

|  | TEST 1 | TEST 2 |
| --- | --- | --- |
| Dry gas (wt. %) | 4.1 | 3.8 |
| Feedstock to be alkylated (vol. %) | 24.1 | 25.2 |
| Gasoline (vol. %) | 57.2 | 60.1 |
| Light cutter stock (vol. %) | 16.5 | 16.0 |
| Heavy cutter stock (vol. %) | 8.3 | 6.5 |
| Coke (wt. %) | 7.3 | 7.2 |
| Conversion at 220° C. (vol. %) | 75.2 | 77.5 |
| Liquid yield of hydrocarbons above $C_3$ | 106.1 | 107.8 |
| Selectivity toward gasolines (vol. %) | 76.1 | 77.5 |
| Octane number of gasoline |  |  |
| RON clear* | 93.5 | 94.1 |
| MON clear* | 82.0 | 82.6 |

*Without additive

We claim:

1. A process for contacting a hydrocarbon feedstock with hot solid particles in a centrally-open substantially vertical tubular reactor operated with a rising dilute fluidized bed having an injection zone for the hydrocarbon feedstock, said process comprising introducing the particles into the tubular reactor in an uprising, vertical flow direction, fluidizing the particles so as to provide a vertically rising, axially moving fluidized bed, injecting feedstock into the injection zone and, at a point in the tubular reactor downstream from the introducing and fluidizing steps, imparting at the outer periphery of said bed a rotational motion about the axis of the reactor effective to counteract backmixing and reduce the residence time of particles at least at the periphery of said bed and also reduce particle density at the periphery of said bed for more uniform particle distribution so that at the injection zone the speed of rotation of the fluidized bed at the periphery of the reactor, in a plane normal to this axis, is from approximately 0.5 to approximately 1.5 times the velocity of the fluids flowing vertically along the axis of the reactor.

2. A process as defined in claim 1 wherein imparting the rotational motion is at a point in the reactor downstream from the introducing and fluidizing steps but upstream from the injecting step.

3. A process for contacting a hydrocarbon feedstock with hot solid particles in a centrally-open substantially vertical tubular reactor which is operated with a vertically rising, axially moving dilute fluidized bed, said process comprising
a. providing a centrally-open substantially vertical reactor for contacting a hydrocarbon feedstock with hot solid particles and which is operated with a vertically rising, axially moving fluidized bed,
b. introducing hot solid particles into said reactor in an uprising, vertical flow direction,
c. fluidizing said particles in a fluidization zone so as to provide said vertically rising, axially moving fluidized bed;
d. injecting a hydrocarbon feedstock into said reactor in a zone of injection located above the point of injection of the hot solid particles and
e. imparting the fluidized bed in a portion of the reactor located above the fluidization zone and below the zone of injection of the hydrocarbon feedstock a rotational motion about the central axis of the reactor so as to produce an equalization of moduli of fluids directly below the zone of injection and so that at the level of introduction of the feedstock rotational speed has been imparted to the fluidized bed at the periphery of the reactor.

4. A process as defined by claim 3, wherein the speed of rotation of the fluidized bed at the periphery of the reactor, in the plane normal to its axis, is from approximately 0.5 to approximately 1.5 times the velocity of the fluids circulating along the axis of the reactor.

5. A process as defined in claim 4, wherein
the average upward velocity of the particles in the fluidized bed where the feedstock is injected is greater than approximately 1 meter per second,
the speed of rotation of the fluidized bed at the periphery of the tubular reactor at the level of injection of the hydrocarbon feedstock is between approximately 1 and approximately 15 meters per second, and
the hydrocarbon feedstock to be converted is injected into the reactor as droplets with a diameter of less than approximately 200 microns.

6. A process as defined in claim 3, wherein substantially all of the solid particles and substantially all of the feedstock in the fluidized bed have an overall upward motion.

7. A process as defined in claim 3, wherein the average upward velocity of the particles in the fluidized bed where the feedstock is injected is greater than approximately 1 meter per second.

8. A process as defined in claim 7, wherein said average upward velocity is between 2 and 10 meters per second.

9. A process as defined in claim 3, wherein the speed of rotation of the fluidized bed at the periphery of the tubular reactor at the level of injection of the hydrocarbon feedstock is between approximately 1 and approximately 15 meters per second.

10. A process as defined in claim 3, wherein the hydrocarbon feedstock to be converted is injected into the reactor as droplets with a diameter of less than approximately 200 microns.

11. A process as defined in claim 10, wherein said diameter is less than approximately 100 microns.

12. A process as defined in claim 2, wherein the imparting of the rotational motion is by injecting fluids and, the fluids injected are of the same type as those used for fluidization of the solid particles.

13. A process as defined in claim 3, wherein the reactor has an interior wall, the rotational motion is imparted by passing the fluidized bed over one or more rigid strips attached to the reactor interior wall and arranged as a spiral, said strips being positioned downstream of the fluidization zone and upstream of the zone of injection of the hydrocarbon feedstock.

14. A process as defined in claim 3, wherein the rotational motion is imparted by injecting a fluid into the fluidized bed at the outer periphery thereof at a position downstream of the fluidization zone and upstream of the zone of injection of the hydrocarbon feedstock.

15. A process as defined in claim 14, wherein the injection of the fluid is from at least two points located symmetrically relative to and at an upward or perpendicular angle to the axis of the reactor.

* * * * *